July 7, 1953  J. P. SMITH  2,644,917
REGULATED HIGH-VOLTAGE POWER SUPPLY SYSTEM
Filed June 30, 1948
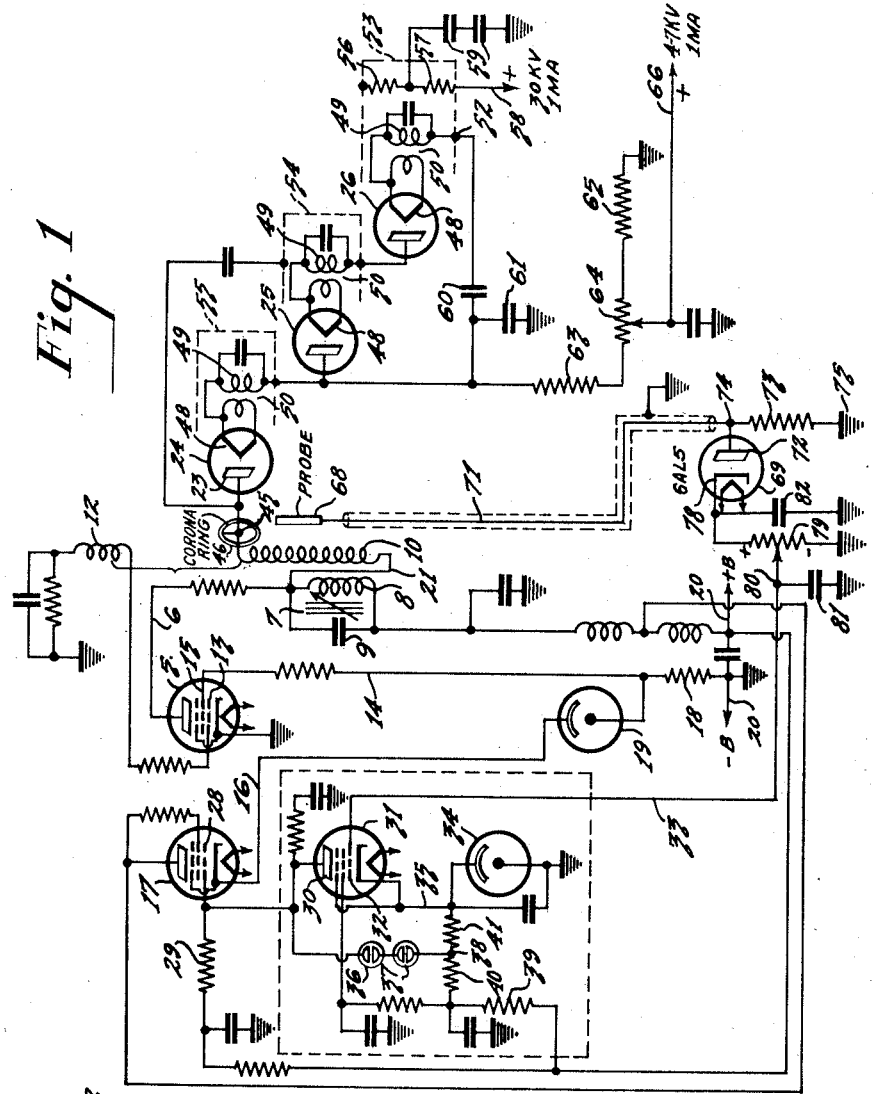
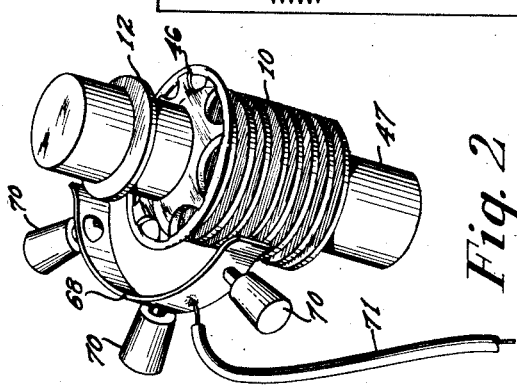
INVENTOR
John P. Smith
BY
ATTORNEY Patented July 7, 1953

2,644,917

UNITED STATES PATENT OFFICE 2,644,917

REGULATED HIGH-VOLTAGE POWER SUPPLY SYSTEM

John P. Smith, Cranbury, N. J., assignor to Radio Corporation of America, a corporation of Delaware Application June 30, 1948, Serial No. 36,238

7 Claims. (Cl. 321—2)

The present invention relates to a regulated high voltage R.-F. power supply system wherein a R.-F. generator or oscillator is provided as the primary power source with subsequent rectification and having in connection therewith regulating means responsive to the rectified output voltage controlling the strength of oscillations and the output voltage in response to varying load.

R.-F. power supply systems are relatively sensitive to load variations because of their inherently poor regulation. Furthermore, in some cases load variations may cause dangerously high voltage surges tending to break down the insulation of associated apparatus and certain of the circuit components of the power supply system. This is particularly true where the power output is provided through one or more rectifiers or voltage multipliers of the electron tube type, the filaments of which are energized from the flow of load current.

It is, therefore, a primary object of this invention, to provide an improved regulated high voltage R.-F. power supply system which is substantially independent of load and power line variations for maintaining effective control of the output voltage.

It is also an object of the invention, to provide an improved power supply system of the character referred to, which derives from the output circuit of the system a minimum amount of energy for control purposes. This is particularly important in this type of power supply system where the full load current may be of the order of a few milliamperes.

A regulated high voltage R.-F. power supply system for which the invention is particularly adapted may comprise a D.-C. amplifier having a regulator tube coupled to a control electrode of an electronic tube oscillator in an R.-F. power supply or generator circuit, the regulator arrangement being such that the plate current of the oscillator is controlled by variations in rectified output voltage derived from a bleeder circuit. The variations in control potential applied to the regulator tube may at times exceed a safe limit and cause the oscillator to generate extremely high voltages.

Accordingly, it is a further object of the invention, to provide an improved regulated high voltage R.-F. power supply system embodying a D.-C. amplifier control circuit, which is prevented from controlling the R.-F. oscillator beyond a predetermined safe limit.

It has been the practice heretofore, to derive controlling potentials from the power supply output circuit through a series of bleeder resistances and high voltage coupling capacitors. The bleeder resistances load the system and withdraw a relatively high percentage of the available power, and the capacitors being insulated for relatively high voltage, are both costly and subject to breakdown on surges with resulting replacements and possible damage to the equipment.

It is, therefore, a still further object of this invention, to provide an improved high voltage R.-F. power supply system which entirely eliminates the above coupling means and the attendant disadvantages thereof, which may be provided at relatively low cost, and which requires substantially no maintenance attention or replacement in operation.

The novel features that are considered characteristic of the invention are set forth with particularity in the appended claims. The invention itself, however, both as to its organization and method of operation, as well as additional objects and advantages thereof, will best be understood from the following description of an embodiment thereof when read in connection with the accompanying drawing, in which Figure 1 is a schematic circuit diagram of a regulated high voltage R.-F. power supply system embodying the invention, and Figure 2 is a view in perspective of a portion of the apparatus of Figure 1, showing a certain relation of the parts thereof.

Referring to Figures 1 and 2, in which like reference numerals refer to like elements throughout, an electronic tube oscillator 5 is provided with an anode output circuit 6 in which is located a tuned R.-F. tank circuit 7 comprising an inductance 8 and a shunt tuning capacitor 9. The inductance 8 is coupled to a high voltage winding 10 which, as shown in Figure 2, may be of the series pancake type comprising a plurality of spaced sections serially connected to provide an inductance for the generation of relatively high voltages.

The inductance 10 is coupled to a grid inductance or feedback winding 12 which is connected to the oscillator grid 13. A control circuit 14 is provided for the oscillator in connection with the screen grid 15. Screen grid voltage is derived from the cathode circuit 16 of a regulator tube 17 having a common impedance or voltage dropping resistor 18 in circuit with the screen grid 15. A voltage regulator tube 19, providing a constant voltage drop is included in the cathode circuit 16 in series with the resistor 18.

Operating anode current is derived from any suitable source indicated by the supply leads 20, for the oscillator 5 and the regulator tube 17 and other anode circuits. A circuit connection 21 through the high voltage coil 10 is utilized to add the R.-F. voltage generated across primary inductance 8 to, and in phase with, the R.-F. voltage generated in the secondary inductance 10 due to mutual coupling, so that the full output voltage is developed at the high voltage end of the inductance 10.

The anode current of the regulator tube 17 is controlled by bias voltage variation of a control grid 28 which is coupled by a coupling resistor 29 with the anode 30 of a D.-C. amplifier tube 31. The control grid 32 of the D.-C. amplifier tube 31 receives a controlling potential from a control lead indicated at 33. A fixed reference potential for the amplifier 31 is provided by a suitable voltage regulator tube 34 in the cathode lead 35, and the anode and likewise the control grid 28 of the regulator tube 17 are connected through a pair of series connected glow discharge (neon) tubes 36 and 37 to a positive tap point 38 on a bleeder circuit comprising resistors 39, 40 and 41 in series with the constant voltage element 34.

The control arrangement described represents any suitable D.-C. amplifier type of control for regulating the power output of the oscillation generator 5 and operates in response to variations in a D.-C. controlling potential applied to the control lead 33 with respect to ground. In the system of the present example, this control potential must at all times be of the order of the voltage drop through the constant voltage source 34 and sufficiently lower to provide a desired negative bias on the grid 32.

As the potential on the control circuit 33 increases in a positive direction, the grid 32 becomes more positive with respect to its cathode, and the D.-C. amplifier connection with the regulating tube 17 causes the grid 28 to become more negative, thereby reducing the anode current through the regulating tube 17 and the voltage drop across the coupling resistor 18 on the screen grid circuit of the R.-F. generator 5. This results in a lowering of the screen grid voltage and of the output anode current, thereby reducing the power output or strength of oscillations delivered to the high voltage winding 10 and to the series of rectifiers 24, 25 and 26, that is, to the output circuit of the power supply system.

Conversely, when the control potential on the control circuit 33 varies in a negative direction, the potential drop through the coupling resistor 29 decreases, causing the control grid 28 to become more positive, thereby increasing the anode current of the regulator tube 17 and the voltage drop through the coupling resistor 18 for controlling the R.-F. oscillator, resulting in a higher output anode current in the oscillator and a higher power output to the high voltage winding 10 and to the rectifiers and the output circuit of the power supply system.

In the operation of the system, at any time should the power output exceed a certain predetermined limit represented by the condition of the control grid 28 when driven in a positive direction, the tap point 38 for the series connected glow discharge tubes 36 and 37 is such that the tubes break down and cause a direct connection through the tubes for the control grid 28 to the terminal 38, thereby to hold the control grid 28 from further excursion in a positive direction and a further increase in the power output of the generator.

It should be noted that since the voltage regulation of the type of tripler circuit comprising rectifier tubes 24, 25 and 26 is good, little is lost by regulating the circuit ahead of them.

The high voltage terminal 45 of the high voltage winding 10 is connected with a suitable corona ring 46 spaced from and surrounding the form 47 (Figure 2) on which the winding 10 is mounted. It will be noted that the feedback winding 12 is located above the corona ring and widely spaced therefrom, although sufficiently close to the winding 10 to provide effective feedback of energy to the grid to sustain oscillations for all conditions of operation. As such high voltage generators may operate at a potential of the order from 30 to 50 kilovolts relatively wide spacing of the elements is desirable.

The system shown is such that the filamentary cathodes 48 of each of the rectifiers 24, 25 and 26 are heated by the passage of R.-F. currents through the primary windings 49 of transformers 50. Thus a path may be traced from the high voltage terminal 45 through anode 23, thence through the first transformer primary from the filament, through the second rectifier 25 and its filament and associated transformer primary and through the third rectifier 26 and the associated transformer primary to a terminal 52 which is connected with a shield 53 corresponding to other shields 54 and 55 for the preceding rectifiers.

As this type of voltage tripling circuit is known and used, and since it represents any suitable rectifier or multiplier output circuit, no further description is believed to be necessary.

The output circuit for the power supply system is connected through a series filter comprising a resistor 56 connected to the shield 53, a second filter element 57 and thence to the output lead 58, suitable high voltage filtering capacitors 59 being connected serially between ground and the intermediate point between the resistors 56 and 57. Resistors 56 and 57 are made low enough in resistance value so that they increase the overall regulation of the supply by only two per cent.

The rectifier 24 is effectively in shunt with the output through an output impedance or bleeder network comprising resistors 63, 64 and 65 connected serially to ground and having a variable tap output connection 66 with the resistor 64, thereby providing a lower voltage for operating certain types of loads.

With the system shown it will be seen that a heavy load or short circuit on the output leads 58 and 66 may reduce the output current to such a low value that the filaments 48 may be cut off from sufficient operating current to cause operation of the rectifier. Under such conditions when the output voltage is depended upon for regulating the power output of the oscillator, it will be seen that the oscillator output may be driven to a relatively high value before the filaments are again in full operation, and this voltage may be excessively high and sufficient to burn out the filaments, when the heavy load or short circuit is removed, thereby again causing the voltage from the oscillator to rise to dangerously high levels.

Further in accordance with the invention, however, a probe electrode 68 is positioned adjacent to the high voltage oscillator output winding 10, preferably near the high voltage end or near the corona ring, to provide effective low capacity electrostatic coupling for withdrawing sufficient energy or voltage to operate a rectifier 69 connected with the lead 33 and provide a rectified control potential for the system.

In the present example, the probe may be of any suitable form, such as a short rod or plate, curved, for example as shown in Figure 2, and supported on insulators 70 in spaced relation to the corona ring 46 or the high voltage end of the winding 10. A lead 71 from the probe extends to anode 72 of the rectifier 69 and provides the input voltage across a coupling impedance or resistor 73 connected between a terminal 74 and ground 75.

The rectifier cathode 78 is connected through an output impedance or resistor 79 having a variable tap connection 80 thereon which is connected with the control lead 33 of the system. Suitable bypass capacitors 81 and 82 are provided to prevent the application of high frequency currents to the control circuit 33 through the rectifier.

With the foregoing circuit arrangement, an adjustable probe or electrode is used to sample the R.-F. field of the high voltage oscillator output inductance to withdraw a relatively small amount of energy. The resulting R.-F. energy is rectified and utilized as a D.-C. control voltage for the oscillator. Thus no high voltage capacitors are required and less power is wasted than in the conventional bleeder system, which has two distinct disadvantages. First, the bleeder must be used across the high voltage output circuit, which dissipates useful power, and second, when a negatively grounded power supply is required the D.-C. amplifier problem is greater, since another stage must be added, or other means found for reversing the polarity over that of a standard D.-C. amplifier designed for negative grounded supplies.

The probe 68 in the R.-F. field about the oscillator coil operates to control the power output by reason of the fact that the strength of the R.-F. field around the output coil is proportional to the power output of the oscillator. It has been found that a probe in the form of a brass strip or rod adjustable from one to two inches in length and only a fraction of an inch in width, spaced a few inches away from the coil or corona ring will pick up enough R.-F. energy to give several hundred volts of D.-C. output when rectified by means of a miniature tube at 69 such as a commercial type known as a 6AL5.

The operation is such that as the load on the oscillator increases, tending to reduce the oscillator output voltage, the voltage between the probe 68 and ground 75 is reduced, thereby reducing the D.-C. output or control voltage from the rectifier 69 across the resistor 79, and applying to the control circuit 33 through the terminal 80 a lower positive potential. Thus the control voltage increases in a negative direction, thereby causing the anode current through the resistor 29 to decrease and providing a corresponding increase in the positive potential applied to the control grid 28. This provides an increase in the positive potential derived across the resistor 18, thereby increasing the screen grid potential of the oscillator 5, and resulting in a higher plate current and higher output to the coil 10 and the high voltage terminal 45, all as hereinbefore pointed out. Conversely, a lowering of the load current on the oscillator tends to cause the voltage in the coil 10 to rise, thereby having an opposite effect upon the control circuit through the rectifier 69, reducing the anode current to the oscillator and the output voltage accordingly. Adjustment of the output voltage to cover a predetermined range is made by adjusting the contact 80 as well as the capacity coupling provided by the electrode 68. This capacity must be low with respect to the capacity between the lead 71 and ground or to the grounded shield.

From the foregoing description it will be seen that a system in accordance with the invention provides a separate control circuit for an R.-F. power generator which is energized from the R.-F. field of the oscillator output winding through electrostatic low capacity coupling. This system has the advantage that the high voltage R.-F. power generator, operating at 30 kilovolts and having a total output of only 30 watts for example, is entirely free of any additional bleeder networks as ordinarily required for controlling the generator output, and which may draw as high as .33 milliampere of current, thereby tending to waste 10 watts or approximately ⅓ of the power in the present example. The system eliminates the usual resistance bleeder coupling which is wasteful of power at high voltages with R.-F. power supply systems. Furthermore, it eliminates high voltage capacitor couplings with the R.-F. circuit and danger of voltage breakdown common to power supply systems of this character heretofore known and used. This protection feature is further highly desirable for the reason that if the rectifier filaments 48 cool off due to a short circuit on the output circuit, the control circuit will remain energized from the oscillator through the probe, and through the hereinbefore described regulator action, keeps the output voltage down to a safe value where the short circuit is removed. Thus when the control builds up voltage in the present system, the filaments may light up without being subjected to high voltage surges.

Furthermore, the use of a separate rectifier for better regulation or control of voltage output, and a low capacitance probe electrode providing capacitive coupling with the output circuit minimizes power loss, since sufficient energy for operating the control circuit can be withdrawn while maintaining a relatively low overall capacity or total capacity to ground, and no direct contact or connection with the high voltage output circuit is required.

I claim as my invention:

1. In a high voltage power supply system of the type including an electron tube oscillator having a high voltage output inductance and high voltage output rectifier means coupled thereto, an output voltage regulating circuit for said oscillator comprising a D.-C. amplifier connected with said oscillator having a control circuit responsive to a D.-C. control potential to vary the anode current and output voltage of said oscillator, a second rectifier having an output circuit variably connected with said D.-C. amplifier control circuit to apply said control potential thereto, and a probe electrode in the field of said high voltage output inductance in spaced low capacity coupling relation thereto and connected with said second rectifier to apply energy derived from said output inductance field to said rectifier which rectifies said energy and applies it as said control voltage to said D.-C. amplifier control circuit to maintain said oscillator output voltage constant.

2. A high voltage power supply system as defined in claim 1 wherein the high voltage output inductance is provided with a corona ring connected with the high voltage end of said inductance, and said probe electrode is provided by an insulated conductor element mounted in spaced relation to said corona ring.

3. In a high voltage power supply system of the type having, an electron tube oscillator having a tuned R.-F. output circuit including a high voltage output inductance, and high voltage output rectifier and multiplier means coupled to said inductance, an output voltage control circuit for said oscillator comprising a D.-C. amplifier connected with said oscillator having a control circuit responsive to a D.-C. control potential for varying the anode current and output voltage of said oscillator, a second rectifier having an output circuit variably connected with said control circuit to apply said control potential thereto, and a conductive probe electrode in the field of and spaced from said output inductance and connected with said last named rectifier and to ground to apply energy thereto from said oscillator output inductance, independently of the operation of the first named rectifier means, thereby to control the output voltage from said system.

4. In a regulated high voltage power supply system having a tuned high frequency electron tube oscillator with an anode output circuit, a high voltage output inductance coupled to said anode output circuit, and a high voltage rectifier and voltage multiplier circuit coupled to said output inductance, said last named circuit being subject to surges resulting from load variations and the like, the combination with said oscillator of a system for compensating for said load surges comprising an insulating conductor of relatively short length mounted in spaced relation to said inductance and within the electrostatic field thereof as an electrostatic probe electrode for said field, a resistor connected between said probe and ground, whereby a potential with respect to ground is developed across said resistor when said oscillator is in operation, a second rectifier, a D.-C. output circuit for said rectifier connected in series therewith, said series connected rectifier and D.-C. output circuit being connected in shunt with said resistor whereby a D.-C. control potential is developed across said D.-C. output circuit proportional to said oscillator output, and control circuit means to control the anode current of said oscillator responsive to said D.-C. control potential to compensate for said load surges.

5. A regulated high voltage power supply system as defined in claim 4, wherein said control circuit means includes a D.-C. amplifier having a first stage connected with said D.-C. output circuit, and having a second stage provided with voltage limiting means including at least one neon tube connected between a grid circuit thereof and a point of limiting potential for controlling the gain of said D.-C. amplifier in response to an overload condition of operation of said system.

6. In a high voltage power supply system having an R.-F. oscillator, and output regulator system for said oscillator comprising a high voltage rectifier coupled to said oscillator to receive energy therefrom, a high voltage inductance in said coupling, a low capacity probe electrode in the electrostatic field of said inductance, a voltage control circuit for said oscillator connected with said electrode, said circuit being also connected to a circuit reference point whereby said circuit is in said high voltage power supply system of substantially zero voltage energized from the electrical field of said inductance.

7. In a high voltage power supply system of the type including a high frequency oscillator having an output inductance, the combination therewith of an output regulating system for said oscillator comprising a D.-C. amplifier having a control voltage input circuit and being coupled to said oscillator to control its output current, a rectifier having a D.-C. output circuit variably connected to said input circuit, and a conductive probe electrode comprising a low capacity electrostatic coupling means positioned in spaced relation to the output inductance and in the electrostatic field thereof, and wherein the capacity between said electrode and ground for the system is relatively low to prevent undoing loading of said system and wherein further the capacity between said electrode and said inductance is relatively lower than said first named capacity.

JOHN P. SMITH.

References Cited in the file of this patent

UNITED STATES PATENTS

| Number | Name | Date |
|---|---|---|
| 2,103,619 | Hallmark | Dec. 28, 1937 |
| 2,104,463 | Johnson et al. | Jan. 4, 1938 |
| 2,246,928 | Schick | June 24, 1941 |
| 2,459,638 | Fyler | Jan. 18, 1949 |

OTHER REFERENCES

R. F. Operated HV Supplies, Schade, April 1943, Pub. No. S5-235, by R. C. A., pages 161, 163.

Principles of Radar, 2nd ed., M. I. T. Staff, McGraw Hill, 1946, pp. 10-48.